(12) United States Patent
Hsiao et al.

(10) Patent No.: US 8,233,234 B2
(45) Date of Patent: Jul. 31, 2012

(54) STEPPED MAIN POLE FOR PERPENDICULAR WRITE HEADS IN HARD DISK DRIVES AND METHOD OF MAKING SAME

(75) Inventors: Wen-Chien D. Hsiao, San Jose, CA (US); Ming Jiang, San Jose, CA (US); Sue S. Zhang, Saratoga, CA (US); Yi Zheng, San Ramon, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 740 days.

(21) Appl. No.: 12/342,647

(22) Filed: Dec. 23, 2008

(65) Prior Publication Data

US 2010/0157475 A1 Jun. 24, 2010

(51) Int. Cl.
*G11B 5/127* (2006.01)
*H01F 10/08* (2006.01)
*H01L 43/12* (2006.01)

(52) U.S. Cl. ........... 360/125.09; 360/125.1; 360/125.11; 360/125.13; 360/125.14; 360/125.15; 428/815; 428/815.2

(58) Field of Classification Search .................. None
See application file for complete search history.

(56) References Cited

U.S. PATENT DOCUMENTS

| 5,793,578 | A | * | 8/1998 | Heim et al. | 360/125.4 |
| 6,710,973 | B2 | | 3/2004 | Okada et al. | |
| 7,100,266 | B2 | | 9/2006 | Plumer et al. | |
| 7,159,302 | B2 | | 1/2007 | Feldbaum et al. | |
| 7,185,415 | B2 | | 3/2007 | Khera et al. | |
| 7,219,414 | B2 | | 5/2007 | Watabe et al. | |
| 7,245,454 | B2 | | 7/2007 | Aoki et al. | |
| 7,251,878 | B2 | | 8/2007 | Le et al. | |
| 7,253,992 | B2 | | 8/2007 | Chen et al. | |
| 2005/0024779 | A1 | * | 2/2005 | Le et al. | 360/317 |
| 2006/0002024 | A1 | * | 1/2006 | Le et al. | 360/126 |
| 2006/0198050 | A1 | * | 9/2006 | Mochizuki et al. | 360/126 |
| 2007/0209193 | A1 | | 9/2007 | Kobayashi | |
| 2008/0316644 | A1 | * | 12/2008 | Lee et al. | 360/110 |
| 2009/0141397 | A1 | * | 6/2009 | Hsiao et al. | 360/119.02 |
| 2010/0149688 | A1 | * | 6/2010 | Le et al. | 360/125.41 |

FOREIGN PATENT DOCUMENTS

| JP | 63029311 | 2/1988 |
| JP | 2005166259 | 6/2005 |
| JP | 2005285296 | 10/2005 |

* cited by examiner

*Primary Examiner* — Kevin Bernatz
(74) *Attorney, Agent, or Firm* — Patterson & Sheridan, LLP

(57) ABSTRACT

A stepped main pole for a perpendicular write head and methods of making the stepped main pole. The stepped main pole has a main pole tip and a base portion. The main pole tip has a surface that forms part of the ABS and a first thickness. The base portion extends from the main pole tip and has a thickness that varies from the first thickness to a second thickness to form a slanted surface with an apex angle adjacent the main pole tip. By placing the base portion away from the ABS and providing a thickness that increases in a direction away from the ABS, the stepped pole can provide the necessary magnetic flux for writing, while avoiding undesired leakage and fringing. To form embodiments of the stepped main pole of the invention, a fluorine-based reactive ion etch (RIE) may be used. By using an RIE to define the stepped main pole, the apex angle can be better controlled and tight edge control can be achieved.

20 Claims, 7 Drawing Sheets

STEPPED MAIN POLE FOR PERPENDICULAR WRITE HEADS IN HARD DISK DRIVES AND METHOD OF MAKING SAME

BACKGROUND OF THE INVENTION

1. Field of the Invention

Embodiments of the present invention generally relate to write heads for hard disk drives and in particular to a stepped pole for a write head used for perpendicular recording on a magnetic disk.

2. Description of the Related Art

There has been increasing progress in the field of magnetic disk storage system technology in recent years. Such success has made storage systems an important component of modern computers. Some of the most important customer attributes of any storage system are the cost per megabyte, data rate, and access time. In order to obtain the relatively low cost of magnetic disk storage systems compared to solid state memory, the customer must accept the less desirable features of this technology, which include a relatively slow response, high power consumption, noise, and the poorer reliability attributes associated with any mechanical system. On the other hand, magnetic storage systems have always been non-volatile; i.e., no power is required to preserve the data, an attribute which in semiconductor devices often requires compromises in processing complexity, power-supply requirements, writing data rate, or cost. Improvements in areal density (the amount of information that can be placed within a given area on a disk drive), have been the chief driving force behind the historic improvement in storage cost. In fact, the areal density of magnetic disk storage systems continues to increase. Today, as the magnetic particles that make up recorded data on a magnetic disk become ever smaller, technical difficulties in writing and reading such small bits occur. Further, as areal density increases, the requirements put on head designs continue to become more challenging.

As the demand for storage has increased dramatically over time, technologists have worked toward increasing the amount of information that can be stored onto disk drives. By increasing the areal density, technologists have been able to deliver increasing storage capacity over the course of the last several years. A key end-result or benefit of this dramatic areal density curve is that disk drive manufacturers have also been able to reduce the cost of the disk drives themselves because they can offer higher capacity disk drives using fewer disks, heads, and mechanical parts. Increasing areal densities to allow greater capacities is no small task. As it has become more challenging to increase areal densities in longitudinal recording, to go to even higher areal densities, researchers are looking at several alternatives, including perpendicular recording. In recent years, the increased demand for higher data rate and areal density has driven the perpendicular head design to scale toward smaller dimensions and the need for constant exploration of new head designs, materials, and practical fabrication methods.

It can be seen then that there is a need for a write pole in a magnetic head that provides effective magnetic flux to the pole tip for writing to a magnetic disk, while avoiding leakage or fringing that can result in side writing and side erasure.

SUMMARY OF THE INVENTION

In one embodiment the invention is a method of making a stepped main pole for a magnetic write head that includes providing a processed substrate, wherein the processed substrate has a magnetic pole portion and an adjacent non-magnetic dielectric portion, a film on the pole portion and the dielectric portion of the substrate, the film having exposed and unexposed portions, a stop layer on the unexposed portion of the film, and a polyimide layer on the stop layer. The exposed portion of the film is etched such that a surface of the magnetic pole portion and the adjacent non-magnetic dielectric portion is exposed and a taper is formed in the film. The taper extends from the stop layer to the exposed surface of the magnetic pole portion and adjacent non-magnetic dielectric portion, and forms an obtuse apex angle between the taper and the exposed surface of the magnetic pole portion and adjacent non-magnetic dielectric portion.

In a further embodiment, the invention is a stepped main pole for a magnetic write head. The stepped main pole has a main pole tip with a surface forming part of an air bearing surface (ABS) and a bottom surface. The main pole tip has a first thickness and a first width. A base portion extends from the main pole tip and has a thickness that varies from the first thickness to a second thickness to form a slanted surface adjacent the main pole tip. The base portion also has a width that varies from the first width to an increasing width to form a flare that extends from a flare point adjacent the main pole tip. The flare point is at a first distance L1 from the ABS and the slanted surface of the base portion starts at a point that is at a second distance L2 from the ABS, such that $L2 \geq L1$. The slanted surface of the base portion and a bottom surface of the main pole tip form an obtuse apex angle therebetween.

In yet a further embodiment, the invention is a magnetic write head. The magnetic write head includes a stepped main pole and the stepped main has a main pole tip with a surface forming part of an air bearing surface (ABS) and a bottom surface. The main pole tip has a first thickness and a first width. A base portion extends from the main pole tip and has a thickness that varies from the first thickness to a second thickness to form a slanted surface adjacent the main pole tip. The base portion also has a width that varies from the first width to an increasing width to form a flare that extends from a flare point adjacent the main pole tip. The flare point is at a first distance L1 from the ABS and the slanted surface of the base portion starts at a point that is at a second distance L2 from the ABS, such that $L2 \geq L1$. The slanted surface of the base portion and a bottom surface of the main pole tip form an obtuse apex angle therebetween.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
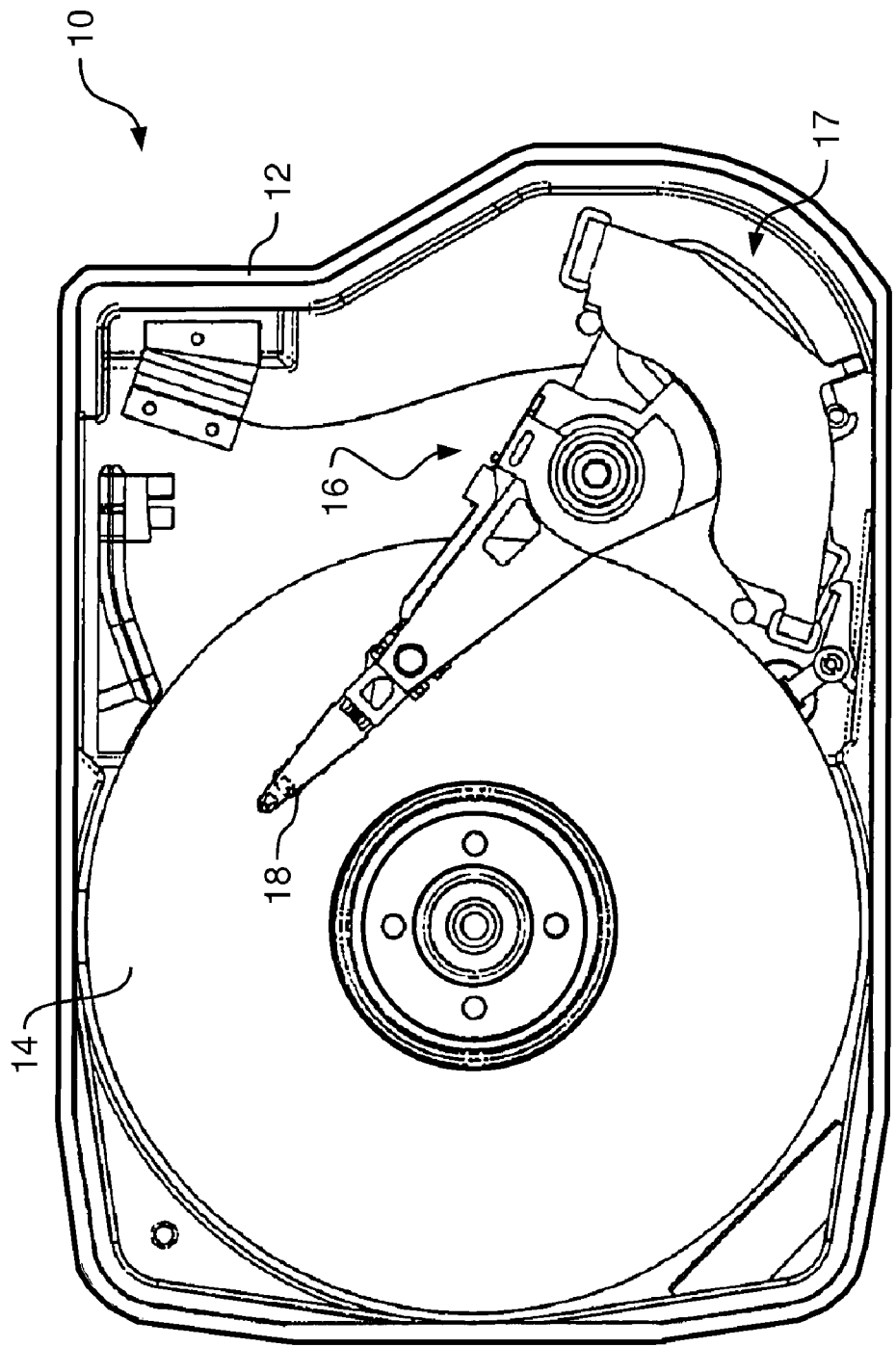
FIG. 1 shows an exemplary disk drive having a magnetic disk, and magnetic read/write head mounted on an actuator, according to one embodiment of the invention.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

The write pole is the critical structure in the head design that needs to be optimized to bring maximal effective magnetic flux to the pole tip. One approach is to construct the flux guide layer closer to the air bearing surface (ABS) to achieve a higher write field. However, this has proven to be challenging because moving the flux guide layer closer to the ABS introduces other issues. The flux guide layer is generally much bigger in area at the ABS view as compared to the write pole. A write field that is generated by an applied current would prefer to leak or fringe from the guide layer instead of being funneled toward the pole tip. When the flux guide layer is closer to the ABS, this leakage or fringing will contribute significantly to side writing and side erasure. While a laminated main pole having a thickness between 90 to 250 nm would provide the correct dimensions for higher areal density, it is not strong enough to effectively write to the disk. A need therefore exists for a write pole that provides adequate flux for writing to the disk, while avoiding fringing or leakage near the ABS that can cause side writing and side erasure.

Embodiments of the invention provide for a stepped main pole and methods of making a stepped main pole. In a write head for perpendicular recording on a magnetic disk, the amount of magnetic material (thickness) in the main pole contributes to the magnetic flux applied to the disk. If this thickness is too large at the ABS, however, leakage and fringing can occur that result in side writing and side erasure. To avoid these issues, embodiments of the invention provide for a stepped main pole for a magnetic write head having a main pole tip and a base portion. The main pole tip has a surface adjacent the ABS, a first width and a first thickness. The base portion extends from the main pole tip and has a thickness that varies from the first thickness to a second thickness to form a slanted surface having an apex angle adjacent the main pole tip. The base portion also has a width that varies from the first width (at a flare point) to increasing width along two 45° lines, in one embodiment. By placing the base portion about 100 nm to 300 nm, for example, from the ABS and providing a thickness and a width that increases in a direction away from the ABS, the stepped pole can provide the necessary magnetic flux for writing, while avoiding undesired leakage and fringing.

According to at least one embodiment, the stepped main pole of the invention is formed using a fluorine-based reactive ion etch (RIE). By using a RIE process to define the stepped main pole, the apex angle of the slanted surface can be better controlled and tight edge control can be achieved. By using Fluorine chemistry such as $CF_4$, $CHF_3$, $C_3F_8$ or $SF_6$, materials such as SiC, TaO, $Ta_2O_5$, Ta, $Al_2O_3$ can be etched. The apex angle is tunable by varying RIE process conditions such as gas pressure, gas flow rate, source power and platen RF power. The angle ranges from 20° to 90° with different material/RIE process combinations.

FIG. 1 shows one embodiment of a magnetic hard disk drive 10 that includes a housing 12 within which a magnetic disk 14 is fixed to a spindle motor (SPM) by a clamp. The SPM drives the magnetic disk 14 to spin at a certain speed. A head slider 18 accesses a recording area of the magnetic disk 14. The head slider 18 has a head element section and a slider to which the head element section is fixed. The head slider 18 is provided with a fly-height control which adjusts the flying height of the head above the magnetic disk 14. An actuator 16 carries the head slider 18. In FIG. 1, the actuator 16 is pivotally held by a pivot shaft, and is pivoted around the pivot shaft by the drive force of a voice coil motor (VCM) 17 as a drive mechanism. The actuator 16 is pivoted in a radial direction of the magnetic disk 14 to move the head slider 18 to a desired position. Due to the viscosity of air between the spinning magnetic disk 14 and the head slider's air bearing surface (ABS) facing the magnetic disk 14, a pressure acts on the head slider 18. The head slider 18 flies low above the magnetic disk 14 as a result of this pressure balancing between the air and the force applied by the actuator 16 toward the magnetic disk 14.

Figure 2:
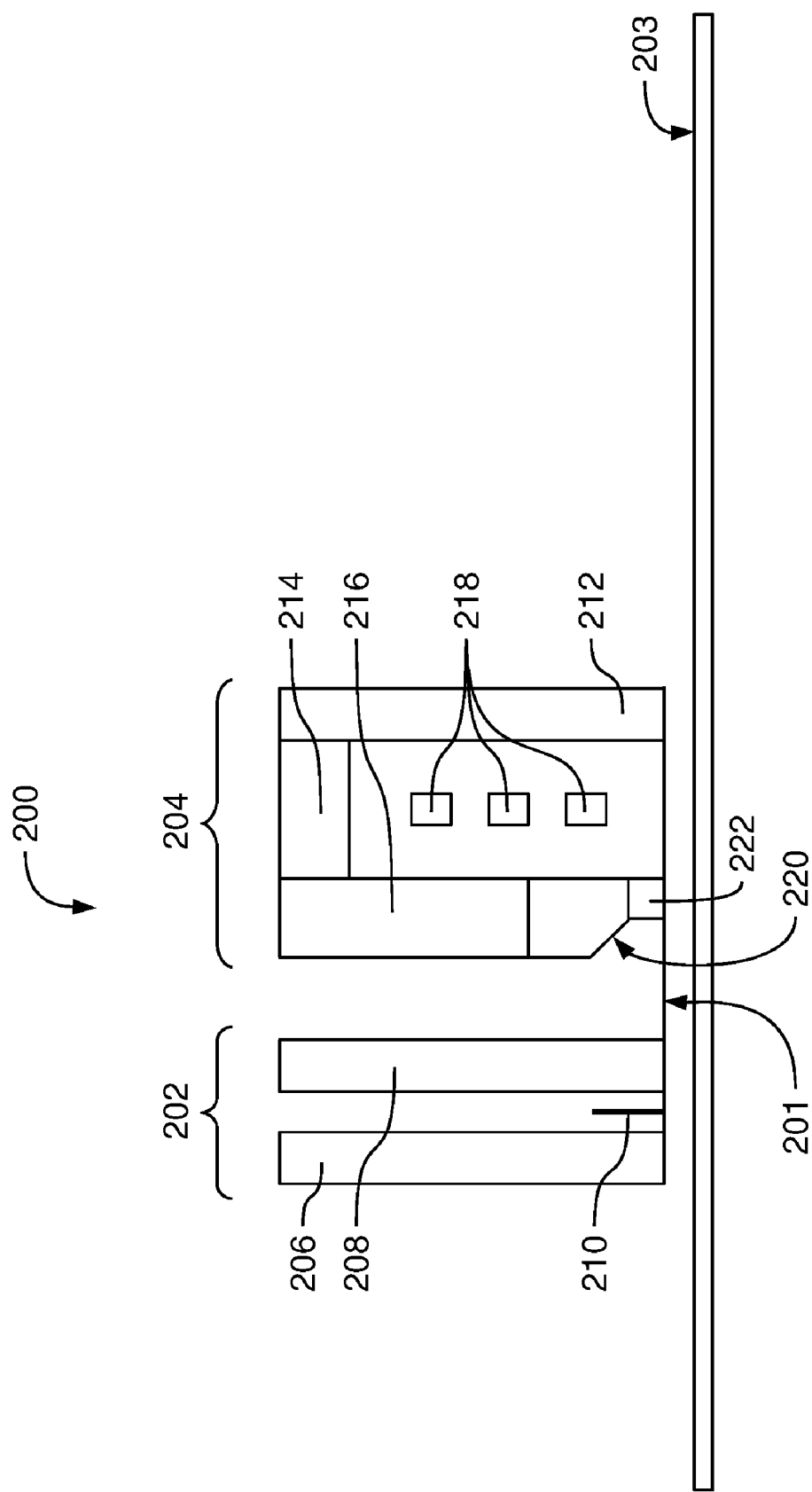
FIG. 2 is a side view of the read/write head and magnetic disk of the disk drive of FIG. 1, according to one embodiment of the invention.

FIG. 2 is a side view of an embodiment of a read/write head 200 (which may be disposed on the head slider 18 of FIG. 1) and magnetic disk 203 of the invention. Read/write head 200 has an air bearing surface (ABS) 201, a read head 202 and a perpendicular write head 204. Read head 202 includes a magnetoresistive read element 210 that is mounted between a pair of magnetic shields 206 and 208. Perpendicular write head 204 includes an auxiliary pole 212 joined to a main pole 216 by a back gap 214, and a main pole tip 222 attached to the main pole 216. The auxiliary pole 212, main pole 216, back gap 214 and main pole tip 222 are formed of magnetic material to form a continuous magnetic path (yoke) in the write head 204. Conductive coils 218 induce a magnetic flux into the yoke, such that magnetic flux leaves the main pole tip 222 goes through the magnetic disk 203 and returns to the auxiliary pole 212, thereby magnetizing domains on a track of the magnetic disk 203 to record data thereon. Main pole 216 is a stepped main pole and includes a slanted surface 220 that extends from the relatively thinner main pole tip 222 to a relatively thicker portion of the main pole 216 as is described more fully below, with respect to FIGS. 3 and 4A-4C.

Figure 3:
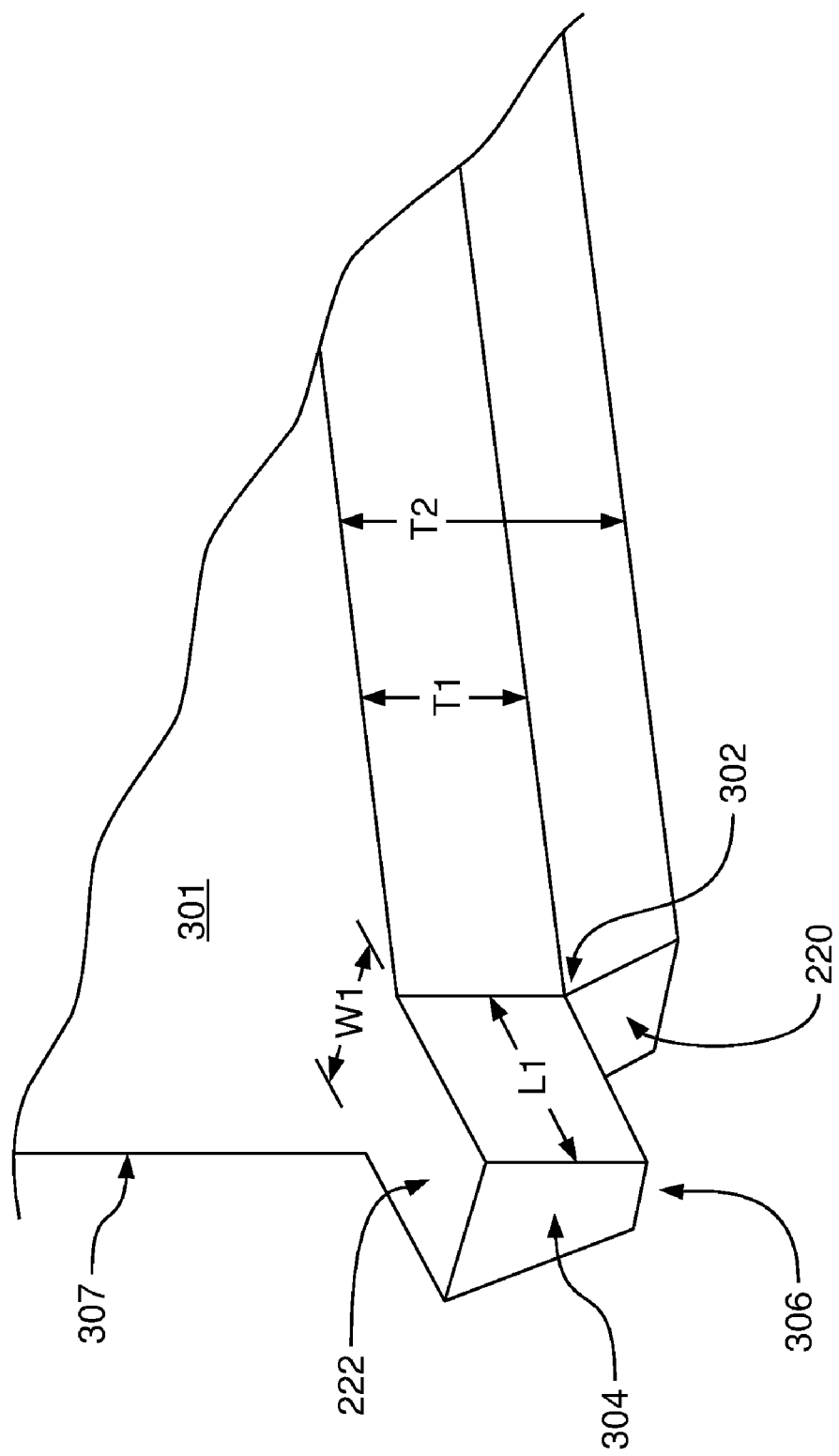
FIG. 3 is a perspective view of a stepped main pole for magnetic write heads, according to one embodiment of the invention.

FIG. 3 shows a perspective view of the stepped main pole 216 of FIG. 2. The main pole tip 222 has a surface 304 that forms part of the ABS 201 (FIG. 2), and a bottom surface 306. The main pole tip 222 extends for a length L1 and has a first thickness T1 and a width W1. The stepped main pole 216 has a base portion 301 extending from the main pole tip 222. The base portion 301 has a thickness that varies from the first thickness T1 to a second thickness T2 to form the slanted surface 220 adjacent to the main pole tip 222. The base portion 301 has a width that varies from width W1 at the main pole tip 222 to an increasing width to form a flare 307 that extends from a flare point 302 adjacent the main pole tip 222. In the figures, the slanted surface 220 of the base portion 301 is shown intersecting the bottom surface 306 of the main pole tip 222 at the flare point 302. In practice, however, the slanted surface 220 starts at a point that is equal to or greater than L1 from the ABS 201, as described further below. The slanted surface 220 and the bottom surface 306 of the main pole tip 222 form an apex angle therebetween as is more fully described below with respect to FIGS. 4A-4C.

Figure 4A:
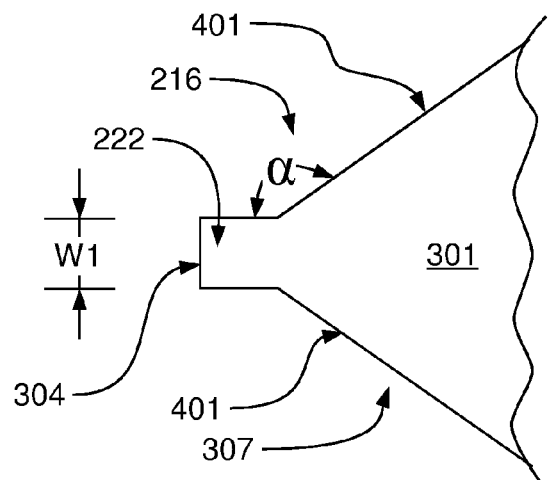
FIGS. 4A-4C are top, side and bottom views, respectively, of the stepped main pole of FIG. 3, according to one embodiment of the invention.
Figure 4B:
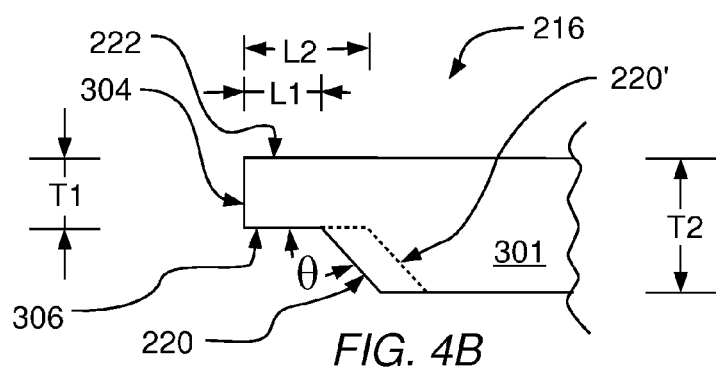
Figure 4C:
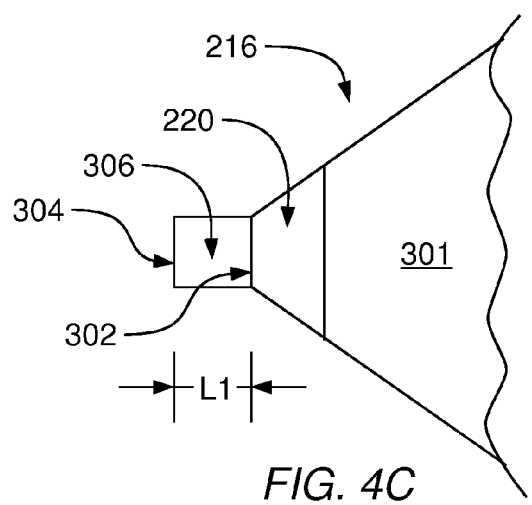

FIG. 4A shows a top view of the stepped main pole 216 of FIG. 2. From this view it is shown that the width of the stepped main pole 216 increases from W1 for main pole tip 222 to increasing width for portion 301, forming flare 307. Flare 307 is formed by providing sides 401 that are at an angle α with the side surface of main pole tip 222. In one embodiment, angle α can be about 135° to about 150°, or around 135°. Surface 304 on the left of the figure forms part of the ABS 201 (FIG. 2), while the flare 307 starts at a flare point 302 that is a distance L1 from surface 304 (at the ABS 201). FIG. 4B shows a side view of the stepped main pole 216 of FIG. 2. From this view it is shown that the thickness of the stepped main pole 216 increases from T1 for main pole tip 222 to T2 at a point on portion 301. The increase in thickness forms slanted surface 220. In FIGS. 4B and 4C it can be seen that slanted surface 220' begins at a distance L2 from surface 304 and ABS 201. In one embodiment, L2=L1, (shown as slanted surface 220), while in other embodiments L2>L1, (shown as slanted surface 220') such that slanted surface 220 starts at a point that is at least as far from the ABS 201, as flare point 302 (L2≧L1). L2 is between 100 nm to 300 nm, such that the slanted surface 220 is between 100 nm to 300 nm from the ABS 201, according to some embodiments of the invention. Bottom surface 306 of main pole tip 222 and slanted surface 220 form apex angle θ (FIG. 4B) therebetween. Angle θ is between 90° and 150°, and may be 135° in one embodiment of the invention.

Figure 5A:
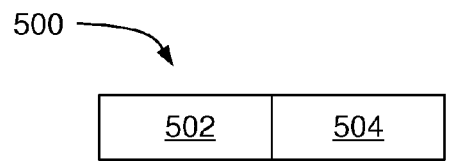
FIGS. 5A-5J are side views showing the various stages of producing a stepped main pole, according to one embodiment of the invention.

FIGS. 5A through 5J show various steps in a method of making a stepped main pole according to one embodiment of the invention. In FIG. 5A, a substrate 500 is provided. The substrate 500 has a magnetic pole portion 502 and an adjacent non-magnetic dielectric portion 504. In one embodiment, the magnetic pole portion 502 is formed of magnetic pole material such as $Ni_{0.8}Fe_{0.2}$, NiFe, CoFe or CoNiFe, while the non-magnetic dielectric portion 504 may be formed of $Al_2O_3$, TaO or $Ta_2O_5$.

Figure 5B:
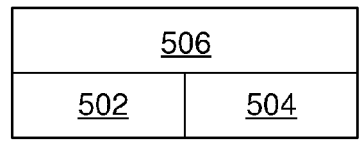
Figure 5C:
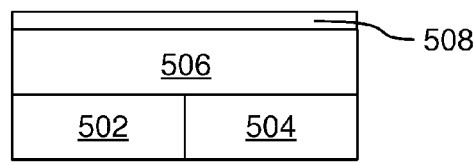
Figure 5D:
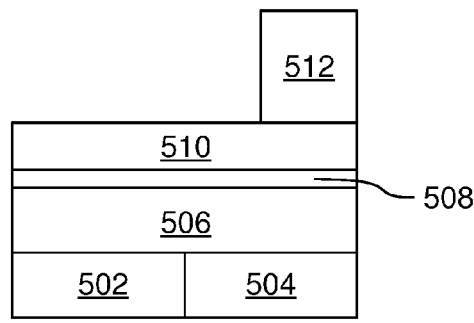
Figure 5E:
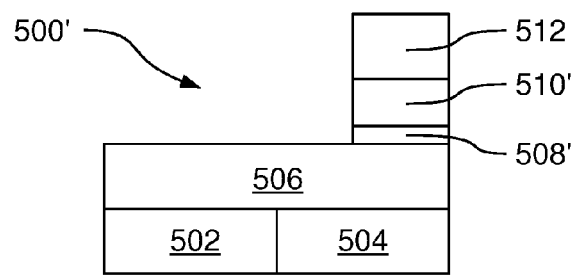
Figure 5F:
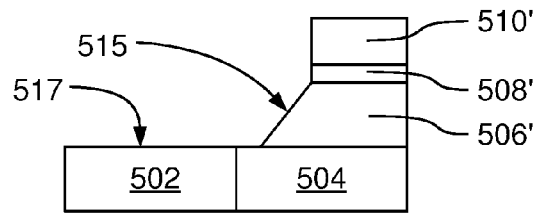

In FIG. 5B, a film 506 is deposited on the pole portion 502 and the dielectric portion 504 of the substrate 500. In one embodiment, film 506 is formed of dielectric material that can be etched using a reactive ion etch (RIE) process, and may therefore be referred to as a "RIE-able" film. Examples of suitable materials for the RIE-able film include but are not limited to SiC, TaO, $Ta_2O_5$, Ta and $Al_2O_3$. A stop layer 508 is then deposited on the RIE-able film 506, as is shown in FIG. 5C. In one embodiment, the stop layer 508 is made of diamond-like carbon (DLC), although other materials resistant to chemical mechanical polishing (CMP) may be used. Accordingly, the stop layer 508 is a CMP stop layer according to one embodiment of the invention. In FIG. 5D a polyimide layer 510 is deposited on the CMP stop layer 508 and a photo-resist layer 512 is deposited and patterned on the polyimide layer 510. In a particular embodiment, polyimide layer 510 may be made of Durimide® 7000 series polyimides available from FujiFilm Electronic Materials U.S.A., Inc. RI, U.S.A. These polyimides are photoimageable polyimide precursors suitable for applications on a wide range of substrates which includes silicon and gallium arsenide, alumina and glass. Other polyimides may be equally suitable. The photo-resist layer 512 is patterned such that portions of the polyimide layer 510 are covered by the photo-resist layer 512 and portions of the polyimide layer 510 are exposed. The photo-resist layer 512 can be made of any of a number of photo-resist materials. After depositing and patterning the photo-resist layer 512, an $O_2$ based RIE process is used on the patterned photo-resist layer 512 and the exposed portion of the polyimide layer 510, such that the exposed portion of the polyimide layer 510 and the portion of the CMP stop layer 508 under the exposed portion of the polyimide layer 510 are removed (forming partial layers 508' and 510') as shown in FIG. 5E. The RIE process, thereby exposes those parts of the RIE-able film 506 not covered by the patterned photo-resist layer 512, resulting in processed substrate 500'.

Figure 6:
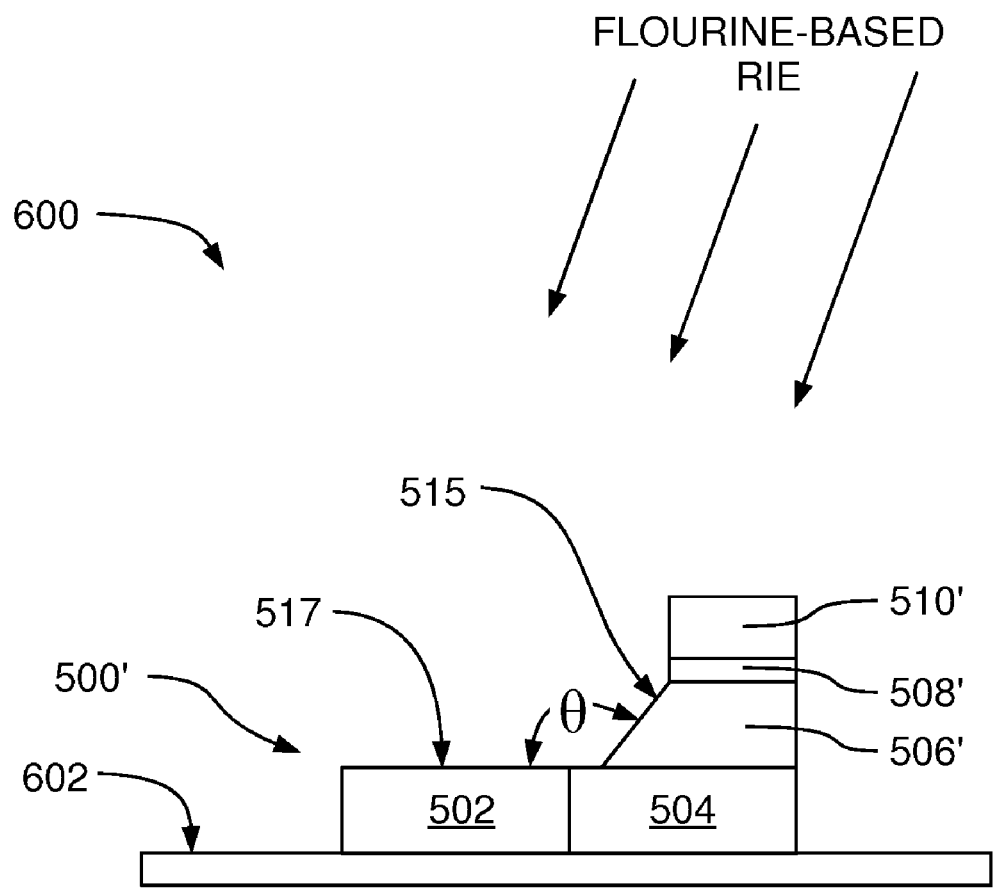
FIG. 6 illustrates a fluorine-based RIE process for forming an apex angle in a stepped main pole, according to one embodiment of the invention.

The processed substrate 500' is further processed by subjecting the exposed portion of the RIE-able film 506 to an etch process, such that the exposed portion of the RIE-able film 506 is etched to form taper 515. In one embodiment, the taper 515 is formed by subjecting the substrate to a fluorine based RIE process. By using fluorine chemistry such as $CF_4$, $CHF_3$, $C_3F_8$ or $SF_6$, materials such as SiC, TaO, $Ta_2O_5$, Ta, $Al_2O_3$ can be etched. The apex angle is tunable by varying the RIE process conditions such as gas pressure, gas flow rate, source power and platen RF power. The angle ranges from 20 deg to 90 deg with different material/RIE process combinations. The taper 515 extends from the remaining CMP stop layer 508' to an exposed portion of the substrate 500 and forms an apex angle θ between the taper 515 and the exposed surface 517 of the substrate. FIG. 6 illustrates a fluorine-based reactive ion etch process 600 used to form taper 515, according to one embodiment of the invention. The processed substrate 500' is placed on a support (platen) 602 within a processing chamber. A gas including fluorine enters the chamber and a plasma is generated using an RF magnetic field as source power. In addition to (or in place of) the plasma source power, a separate RF bias may be applied to the platen 602. The etch rate and the apex angle θ are dependent on the process parameters such as gas pressure, gas flow rate, source power and platen power. By adjusting the process parameters and/or the RIE-able film 506 materials, apex angle θ, can be varied between 20° to 90°, according to one embodiment of the invention.

For example, for one embodiment of the invention, a material such as Al2O3 may be used to form RIE-able film 506. This film 506 is then etched using an inductively coupled plasma (ICP) tool. Process conditions are adjusted within the following ranges to "tune" the angle of taper 515:
Pressure: 1 to 10 mTorr
ICP power: 200 to 800 W
RF power range: 200 to 500 W.
Gas flows:
CHF3: 15 to 50 sccm
CF4: 15 to 50 sccm
Ar: 10 to 30 sccm
Using the above parameters, the taper 515 can be tuned in a range of 30 to 60 degrees.

Figure 5G:
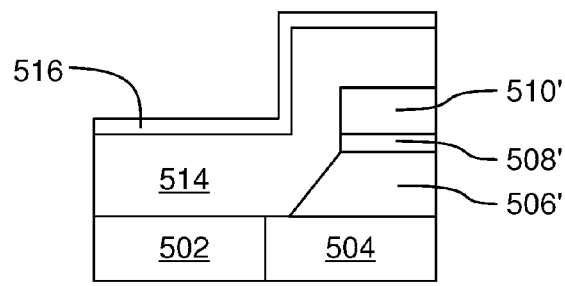

After forming apex angle θ the fabrication method continues as shown in FIG. 5G where a magnetic material layer 514 is deposited on the exposed surface 517 of the substrate, the apex angle θ of the RIE-able film 506' and the remaining polyimide layer 510'. Magnetic material layer 514 is formed of magnetic material such as $Ni_{0.8}Fe_{0.2}$, in one embodiment. An additional CMP stop layer 516 may be deposited on top of the magnetic material layer 514, so that layer 514' (FIG. 5H) will not be polished during the subsequent CMP liftoff process.

Figure 5H:
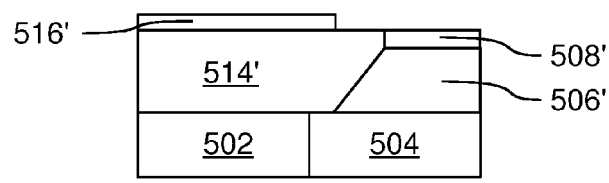
Figure 5I:
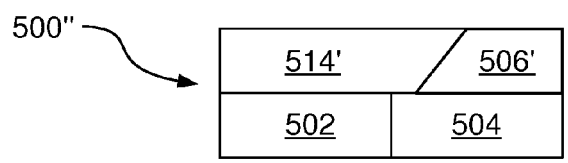
Figure 5J:
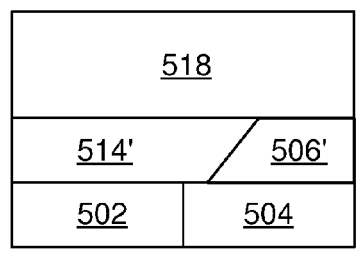

After deposition of the magnetic material layer 514, (and CMP stop layer 516, if required), a CMP liftoff process is used to planarize the magnetic material layer 514', and to remove the remaining polyimide layer 510', as shown in FIG. 5H. An RIE process is then used to remove the CMP layers resulting in the processed substrate 500" as shown in FIG. 5I. In FIG. 5J the stepped pole has been formed. The remainder 518 of the main pole has been deposited on top of the remaining magnetic material layer 514' and the remaining RIE-able film 506'.

While the foregoing is directed to embodiments of the present invention, other and further embodiments of the invention may be devised without departing from the basic scope thereof, and the scope thereof is determined by the claims that follow.

What is claimed is:

1. A magnetic write head, the magnetic write head comprising a stepped main pole, the stepped main pole comprising:
   a main pole tip having a surface adjacent the ABS and a bottom surface, the main pole tip having a first thickness and a first width;
   a base portion extending from the main pole tip, the base portion having a thickness that varies from the first thickness to a second thickness to form a slanted surface adjacent the main pole tip and a width that varies from the first width to an increasing width to form a flare that extends from a flare point adjacent the main pole tip; wherein
   the flare point is at a first distance from the ABS and the slanted surface of the base portion extends between the first distance and a second distance of between 100 nm to 300 nm from the ABS, and the slanted surface of the base portion and the bottom surface of the main pole tip form an angle of between 135 degrees and 150 degrees.

2. The magnetic write head of claim 1, wherein the main pole tip comprises a material selected from the group consisting of $Ni_{0.8}Fe_{0.2}$, NiFe, CoFe, or CoNiFe.

3. The magnetic write head of claim 2, wherein the stepped main pole has a dielectric portion comprising $Al_2O_3$, TaO or $Ta_2O_5$.

4. The magnetic write head of claim 3, further comprises a CMP stop layer comprising diamond-like carbon.

5. A stepped main pole for a magnetic write head, the stepped main pole comprising:
   a main pole tip having a surface forming part of an air bearing surface (ABS) and a bottom surface, the main pole tip having a first thickness and a first width;
   a base portion extending from the main pole tip, the base portion having a thickness that varies from the first thickness to a second thickness to form a slanted surface adjacent the main pole tip and a width that varies from the first width to an increasing width to form a flare that extends from a flare point adjacent the main pole tip; wherein
   the flare point is at a first distance from the ABS and the slanted surface of the base portion extends between the first distance and a second distance of between 100 nm to 300 nm from the ABS, and the slanted surface of the base portion and a bottom surface of the main pole tip form an angle of between 135 degrees and 150 degrees.

6. The stepped main pole of claim 5, wherein the main pole tip comprises a material selected from the group consisting of $Ni_{0.8}Fe_{0.2}$, NiFe, CoFe, or CoNiFe.

7. The stepped main pole of claim 6, wherein the stepped main pole has a dielectric portion comprising $Al_2O_3$, TaO or $Ta_2O_5$.

8. The stepped main pole of claim 7, further comprises a CMP stop layer comprising diamond-like carbon.

9. A method of making the stepped main pole of claim 5, the method comprising:
   providing a processed substrate, the processed substrate having a magnetic pole portion and an adjacent non-magnetic dielectric portion, a film on the pole portion and the dielectric portion of the substrate, the film having exposed and unexposed portions, a stop layer on the unexposed portion of the film, and a polyimide layer on the stop layer; and
   etching the exposed portion of the film such a surface of the magnetic pole portion and the adjacent non-magnetic dielectric portion is exposed and a taper is formed in the film, the taper extending from the stop layer to the exposed surface of the magnetic pole portion and adjacent non-magnetic dielectric portion, and forming an obtuse apex angle between the taper and the exposed surface of the magnetic pole portion and adjacent non-magnetic dielectric portion.

10. The method of claim 9, further comprising depositing a magnetic material layer on the exposed surface of the magnetic pole portion and adjacent non-magnetic dielectric portion, the taper of the film and the polyimide layer.

11. The method of claim 10, further comprising using a chemical mechanical polishing operation to remove a portion of the magnetic material layer above the stop layer.

12. The method of claim 11, further comprising removing the stop layer.

13. The method of claim 12, further comprising laminating a remainder of the main pole on top of the magnetic material layer and the film.

14. The method of claim 13, further comprising depositing a second stop layer on the magnetic material layer prior to using the chemical mechanical polishing operation to remove a portion of the magnetic material layer, to provide additional protection.

15. The method of claim 14, wherein the second stop layer is a chemical mechanical polishing (CMP) stop layer.

16. The method of claim 9, wherein the step of providing a processed substrate comprises:
   providing a substrate having the magnetic pole portion and the adjacent non-magnetic dielectric portion;
   depositing the film on the magnetic pole portion and the dielectric portion of the substrate;
   depositing a stop layer on the film;
   depositing a polyimide layer on the stop layer;
   depositing and patterning a photo-resist layer on the polyimide layer, such that portions of the polyimide layer are covered by the photo-resist layer and portions of the polyimide layer are exposed; and
   subjecting the patterned photo-resist layer and the exposed portion of the polyimide layer to a reactive ion etch process, such that the exposed portion of the polyimide layer and the portion of the stop layer under the exposed portion of the polyimide layer are removed by the reactive ion etch process, thereby patterning the stop layer and the polyimide layer and exposing those parts of the film not covered by the patterned photo-resist layer, to thereby form the processed substrate.

17. The method of claim 9, wherein the film is formed of a material chosen from the group consisting of SiC, TaO, $Ta_2O_5$, Ta, $Al_2O_3$ and combinations thereof.

18. The method of claim 9, wherein the apex angle is between 90 and 150 degrees.

19. The method of claim 9, wherein etching the exposed portion of the film comprises using a fluorine-based, reactive ion etch process that uses a material chosen from the group consisting of $CF_4$, $CHF_3C_3F_8$, $SF_6$ and combinations thereof.

20. The method of claim 9, wherein the stop layer is a chemical mechanical polishing (CMP) stop layer.

* * * * *